United States Patent
Bringer et al.

(10) Patent No.: US 8,594,394 B2
(45) Date of Patent: Nov. 26, 2013

(54) METHOD OF DETERMINING A PSEUDO-IDENTITY ON THE BASIS OF CHARACTERISTICS OF MINUTIAE AND ASSOCIATED DEVICE

(75) Inventors: Julien Bringer, Paris (FR); Herve Chabanne, Paris (FR)

(73) Assignee: MORPHO, Issy-les-Moulineaux (FR)

( * ) Notice: Subject to any disclaimer, the term of this patent is extended or adjusted under 35 U.S.C. 154(b) by 261 days.

(21) Appl. No.: 13/060,689

(22) PCT Filed: Aug. 31, 2009

(86) PCT No.: PCT/FR2009/051645
§ 371 (c)(1),
(2), (4) Date: Feb. 24, 2011

(87) PCT Pub. No.: WO2010/023415
PCT Pub. Date: Mar. 4, 2010

(65) Prior Publication Data
US 2011/0158486 A1      Jun. 30, 2011

(30) Foreign Application Priority Data
Sep. 1, 2008   (FR) ...................... 08 55853

(51) Int. Cl.
*G06K 9/00*   (2006.01)
(52) U.S. Cl.
USPC ............ 382/125; 382/190; 382/254; 358/1.2; 358/1.9
(58) Field of Classification Search
USPC .......................... 382/125, 255, 275, 260, 261
See application file for complete search history.

(56) References Cited

U.S. PATENT DOCUMENTS

| | | | | | |
|---|---|---|---|---|---|
| 3,611,290 | A | * | 10/1971 | Luisi et al. | 382/125 |
| 3,699,519 | A | * | 10/1972 | Campbell | 382/125 |
| 3,893,080 | A | * | 7/1975 | Ho et al. | 382/125 |
| 4,208,651 | A | * | 6/1980 | McMahon | 382/125 |
| 4,646,352 | A | * | 2/1987 | Asai et al. | 382/125 |
| 5,974,163 | A | * | 10/1999 | Kamei | 382/125 |
| 6,049,621 | A | * | 4/2000 | Jain et al. | 382/125 |
| 6,314,197 | B1 | * | 11/2001 | Jain et al. | 382/125 |
| 6,487,306 | B1 | * | 11/2002 | Jain et al. | 382/125 |

(Continued)

OTHER PUBLICATIONS

Capelli et al., "Evaluating Minutia Template Vulnerability to Masquerade Attack," 2007 IEEE Workshop on Automatic Identification Advanced Technologies, IEEE, pp. 174-179, 2007.

(Continued)

*Primary Examiner* — Vu Le
*Assistant Examiner* — Aklilu Woldemariam
(74) *Attorney, Agent, or Firm* — Marshall, Gerstein & Borun LLP

(57) ABSTRACT

Additional information regarding a fingerprint is estimated, with a given level of confidence, on the basis of characteristics of a set of minutiae corresponding to this print. Local descriptors are determined around some at least of the minutiae, so that they comprise, in relation to zones comprising additional information estimated with the given confidence level, values calculated on the basis of said information and, in relation to zones not comprising such information, erasures. The local descriptors determined are quantized according to a given number of integer values, a value being reserved for erasures. The quantized local descriptors are coded with the aid of an error-tolerant coding algorithm associated with a decoding algorithm devised to take account of errors and erasures. And a pseudo-identity is determined on the basis of some at least of the coded quantized local descriptors.

10 Claims, 3 Drawing Sheets

(56) References Cited

U.S. PATENT DOCUMENTS

| | | | |
|---|---|---|---|
| 6,571,014 B1 * | 5/2003 | Larkin | 382/232 |
| 7,194,635 B1 * | 3/2007 | Yoda | 713/193 |
| 8,194,986 B2 * | 6/2012 | Conwell | 382/224 |
| 2002/0150302 A1 * | 10/2002 | McCarthy et al. | 382/254 |
| 2004/0128521 A1 * | 7/2004 | Russo | 713/186 |
| 2006/0104484 A1 * | 5/2006 | Bolle et al. | 382/115 |
| 2008/0298648 A1 * | 12/2008 | Lo et al. | 382/125 |
| 2009/0089587 A1 * | 4/2009 | Brunk et al. | 713/176 |

OTHER PUBLICATIONS

Ross, A., et al., "Toward reconstructing fingerprints from minutiae points," SPIE, Proceedings of the SPIE, pp. 68-80, 2005.

Tulyakov et al., "Symmetric hash functions for secure fingerprint biometric systems," Pattern Recognition Letters, Elsevier, vol. 28, No. 16, pp. 2427-2436, 2007.

* cited by examiner

METHOD OF DETERMINING A PSEUDO-IDENTITY ON THE BASIS OF CHARACTERISTICS OF MINUTIAE AND ASSOCIATED DEVICE

FIELD OF THE INVENTION

The present invention concerns determining a pseudo-identity from elements relating to a fingerprint.

BACKGROUND OF THE INVENTION

Various techniques are known for obtaining an identifier associated with an individual from elements relating to a fingerprint.

One of these techniques described in the article "Fingerprint matching from minutiae texture maps" by F. Benhammadi, M. N. Amirouche, H. Hentous, K. Bey Beghdad and M. Aissani, Pattern Recognition 40 (2007) 189-197, seems particularly interesting.

It provides for the determination of a fixed identifier on the basis of the image of a fingerprint, by extracting from it the minutiae, i.e. the irregularities on the ridge lines of this print, such as the ridge endings and the bifurcations, then by applying Gabor filters to the texture of the fingerprint locally, around each of the extracted minutiae.

Unlike the techniques of the prior art where the identifier resulted from the application of Gabor filters around a morphological core which was not always present or detectable within the fingerprint image, an identifier according to the above-mentioned article can always be obtained, as it is always possible to identify minutiae within the fingerprint image.

The identifier obtained according to this article moreover offers a greater robustness with regard to geometrical transformations which can impact on the fingerprint image, such as translations and/or rotations, since each of the Gabor filters is chosen taking account of the orientation of the minutia around which it is applied.

The technique described in this article however requires full prior knowledge of the image of a fingerprint. This can pose a problem in practice, as most of the current biometric databases do not store such images, but only characteristics relating to the minutiae, as is furthermore required by standard ISO/IEC 19794-2:2005 "Information technology—Biometric data interchange formats—Part 2: Finger minutiae data".

Moreover, the comparison of identifiers determined according to the above-mentioned article "Fingerprint matching from minutiae texture maps" gives less than optimal results, in that it does not take account of certain local specificities of the corresponding fingerprint images, such as their quality or their relevance.

SUMMARY OF THE INVENTION

An object of the present invention is to limit at least some of the above-mentioned drawbacks.

The invention therefore proposes a method of determining a pseudo-identity on the basis of characteristics of a set of minutiae corresponding to a fingerprint. This method comprises the steps of:

estimating additional information on said fingerprint from characteristics of said set of minutiae and with a given level of confidence;

determining local descriptors around at least some of the minutiae of said set of minutiae, the local descriptors comprising, relative to zones containing additional information estimated with the given level of confidence, values calculated from said information and, relative to zones not containing additional information estimated with the given level of confidence, erasures;

quantizing the determined local descriptors according to a given number of integer values, a value being reserved for the erasures;

coding the quantized local descriptors using an error-tolerant coding algorithm associated with a decoding algorithm devised in order to take account of the errors and erasures within the coded quantized local descriptors; and determining a pseudo-identity based on at least some of the coded quantized local descriptors.

As it is based on the characteristics of minutiae, rather than of an already-constituted image of the print, the method is compatible with use in connection with most of the current biometric databases.

Moreover, by involving a level of confidence in the estimation of additional information, it allows a pseudo-identity to be constructed on the basis of more reliable data, thus making it possible to achieve improved efficiency in an optional subsequent verification phase (i.e. phase of comparison between two pseudo-identities).

The use of erasures in the zones wherein the quality is judged to be too low also allows the performance of an optional subsequent verification phase to be improved.

Moreover, coding the quantized local descriptors using an error-tolerant coding algorithm is similar to a diversification operation which ultimately allows a pseudo-identity to be obtained, rather than a fixed identifier as in the prior art mentioned in the introduction.

In fact, the coding and decoding algorithms make it possible to associate a single codeword with two sets of quantized local descriptors that are slightly different but relate to the same fingerprint.

But the coding algorithm can also make it possible to associate two different codewords with two sets of quantized local descriptors relating to the same fingerprint. This results in two different pseudo-identities relating to the same individual (which can be regarded as one variable identifier of said individual). This diversification can prove useful, for example in order to prevent a third party having access to the two pseudo-identities establishing a link between them, or for other reasons.

By way of non-limitative example, it can be envisaged to obtain, from characteristics of a single set of minutiae corresponding to the fingerprint of a given individual, a first pseudo-identity for a use within the context of a first application and a second pseudo-identity, distinct from the first one, for a use within the context of a second application. The use in question can for example consist for said individual of being registered according to his first pseudo-identity in the first application and according to his second pseudo-identity in the second application. The cross-referencing of identity between the two applications can thus be avoided.

Uses other than an identification vary according to applications as mentioned above, and other advantages of the pseudo-identity can also be envisaged, as will be apparent to a person skilled in the art.

According to advantageous embodiments which can be combined in all envisageable ways:

the estimated additional information relates to orientations at different points of the fingerprint;

the estimated additional information relates to a shape of the fingerprint ridge lines;

the determination of the local descriptors around at least some of the minutiae of said set of minutiae is such that the local descriptors contain, relative to the zones containing a quantity of additional information estimated with the given level of confidence, above a threshold, values calculated from said information and, relative to the zones containing a quantity of additional information estimated with the given level of confidence, below said threshold, erasures;

quality levels associated respectively with said additional information are further estimated, and the local descriptors comprise, relative to zones containing the additional information estimated with the given level of confidence, values calculated from said information, taking account of the estimated quality levels;

the determination of the local descriptors is such that the local descriptors are rotation invariants of the fingerprint; and/or the determination of the local descriptors comprises determining zones around at least some of the minutiae of said set of minutiae and the application of respective filters in the determined zones.

According to a further aspect of the invention, a device is proposed comprising means capable of implementing the above-mentioned method. This device comprises:

a unit for estimating additional information on said fingerprint from the characteristics of said set of minutiae and with a given level of confidence;

a unit for determining local descriptors around at least some of the minutiae of said set of minutiae, the local descriptors comprising, relative to zones containing additional information estimated with the given level of confidence, values calculated from said information and, relative to zones not containing additional information estimated with the given level of confidence, erasures;

a unit for quantizing the determined local descriptors according to a given number of integer values, a value being reserved for the erasures;

a unit for coding the quantized local descriptors using an error-tolerant coding algorithm associated with a decoding algorithm devised in order to take account of the errors and erasures within the coded quantized local descriptors; and a unit for determining a pseudo-identity based on at least some of the coded quantized local descriptors.

According to a further aspect of the invention, a computer program product capable of implementing the above-mentioned method is proposed.

This computer program product comprises code instructions for implementing the following steps when loaded and run on computer equipment:

estimating additional information on said fingerprint from characteristics of said set of minutiae and with a given level of confidence;

determining local descriptors around at least some of the minutiae of said set of minutiae, the local descriptors comprising, relative to zones containing additional information estimated with the given level of confidence, values calculated from said information and, relative to zones not containing additional information estimated with the given level of confidence, erasures;

quantizing the determined local descriptors according to a given number of integer values, a value being reserved for the erasures;

coding the quantized local descriptors using an error-tolerant coding algorithm associated with a decoding algorithm devised in order to take account of the errors and erasures within the coded quantized local descriptors; and determining a pseudo-identity based on at least some of the coded quantized local descriptors.

According to a further aspect of the invention, use of the pseudo-identity determined according to the above-mentioned method is proposed in procedures implementing cryptographic algorithms.

BRIEF DESCRIPTION OF THE DRAWINGS

Other features and advantages of the present invention will become apparent from the following description of non-limitative embodiments, with reference to the attached drawings, in which.

DETAILED DESCRIPTION

For the purposes of determining a pseudo-identity according to the invention, initially only characteristics of a set of minutiae corresponding to a fingerprint are available. This set thus typically groups together the set of irregularities existing on the ridge lines of this print, such as the ridge endings and the bifurcations.

In the context of the present invention, it will be noted that the expression "fingerprint" conventionally refers to a biometric print of a finger, but also any similar biometric print, such as a print of a toe, a print of a part of a palm of a hand, etc.

The characteristics of the available set of minutiae can be diverse. They can for example comprise, for each minutia of the set, its type (e.g. ridge ending, bifurcation, other), its coordinates in a Cartesian coordinates system for example and/or its orientation which can be defined for example by the direction (and optionally the bearing) of the tangent to a ridge line at the level of this minutia.

Advantageously, the characteristics of the set of minutiae in question comply with the format specified by the above-mentioned standard ISO/IEC 19794-2:2005. They thus correspond to the information available in a large number of the biometric databases currently in use.

Of course, other characteristics or other formats could be used to describe the set of minutiae in question.

It will be noted however that at this stage, these are the only characteristics available for the set of minutiae. The shape of the ridge lines or other characteristics of the corresponding fingerprint are unknown. Nor is the image of all or part of the fingerprint available.

Additional information on the fingerprint is subsequently estimated on the basis of the characteristics of the set of minutiae.

This additional information can be of different types. It can for example relate to orientations at different points of the fingerprint, typically around the minutiae. An orientation chart can then be obtained.

Figure 1:
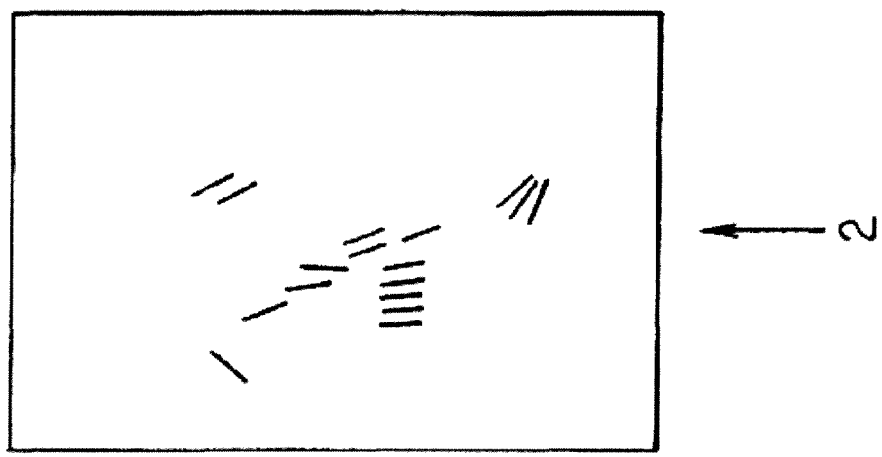
FIG. 1 shows the construction of an orientation chart on the basis of minutiae characteristics.
Figure 1:
Figure 1:
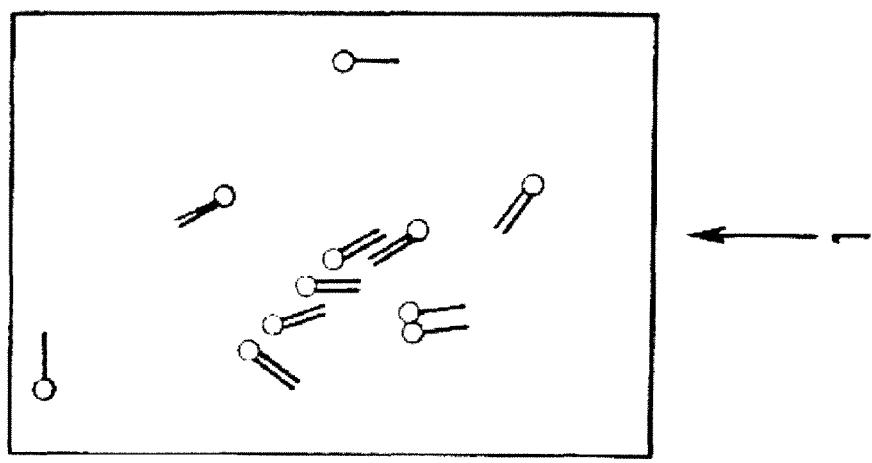

This principle is shown in FIG. 1 where Diagram 1 gives an example of representation of the minutiae of the set in question, on the basis of the available characteristics.

In this diagram, each minutia is shown using a circle which indicates its site within the fingerprint, of the description of which it forms a part, this site being for example deduced from the known Cartesian coordinates of said minutia. It moreover comprises a tail which indicates the known bearing and direction of a ridge line of which said minutia represents an accident. In this example, a single tail shows a minutia of the ridge line ending type, while a double tail shows a minutia of the bifurcation type. Of course, this representation is a non-limitative example only, with no implications for the remainder of the description.

Diagram 2 shows an orientation chart indicating the directions at different points of the fingerprint. Some of these directions arise directly from the known directions of the minutiae, such as those appearing in FIG. 1. As regards other directions, these can be deduced from the known characteristics of the set of minutiae, for example using a suitable algorithm.

An example of such an algorithm is described in the article by R. Cappelli, A. Lumini, D. Maio, D. Maltoni, "Fingerprint Image Reconstruction from Standard Templates", IEEE Transactions on pattern analysis and machine intelligence, vol. 29, No. 9, September 2007, in particular in paragraph 4.2.

As a variant, the additional information on the fingerprint estimated on the basis of the characteristics of the set of minutiae can relate to a shape of the ridge lines of the fingerprint. Reconstruction of the fingerprint is then involved.

Figure 2:
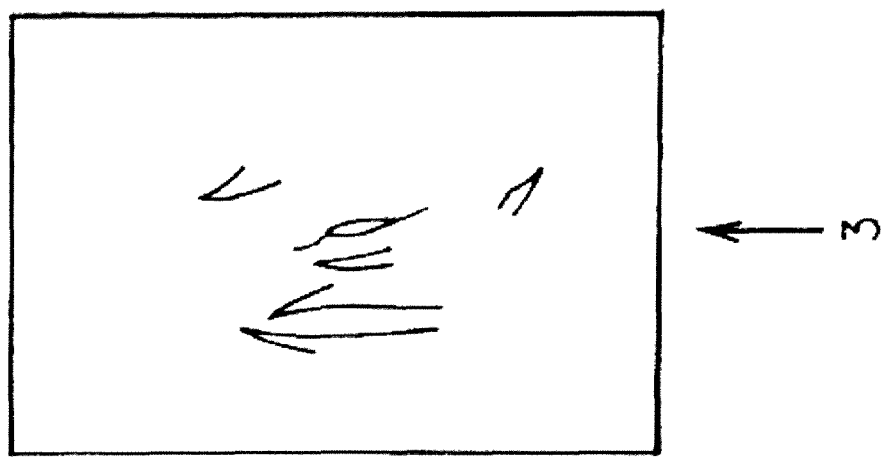
FIG. 2 shows a step of reconstruction of the ridge lines of a print on the basis of minutiae characteristics.
Figure 2:
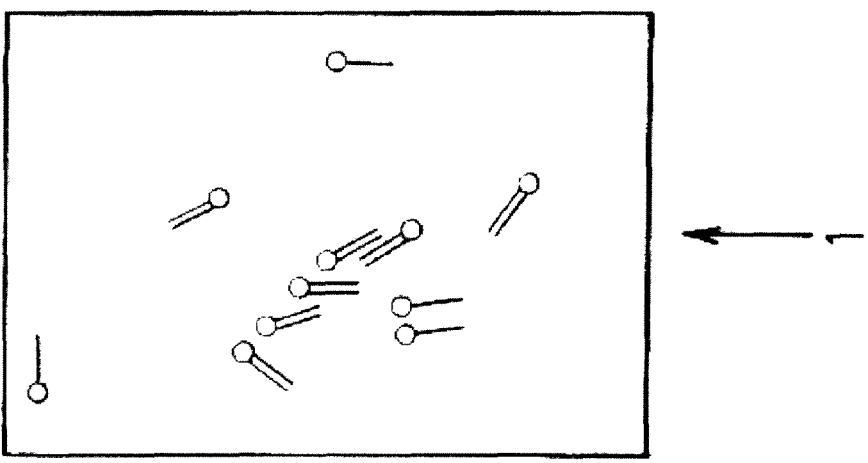

This principle is shown in FIG. 2, where Diagram 1 representing the set of minutiae is identical to that of FIG. 1, and where Diagram 3 includes a certain level of reconstruction of the fingerprint by making portions of some of its ridge lines apparent.

The reconstruction of the fingerprint can be carried out for example using the iterative algorithm described in the above-mentioned article "Fingerprint Image Reconstruction from Standard Templates" in particular in paragraph 4.3.

In all cases, and unlike the algorithms of the prior art, the estimation of the additional information on the fingerprint on the basis of the characteristics of the set of minutiae is carried out with a given level of confidence. This means that only the additional information having a certain quality level is estimated.

Figure 3:
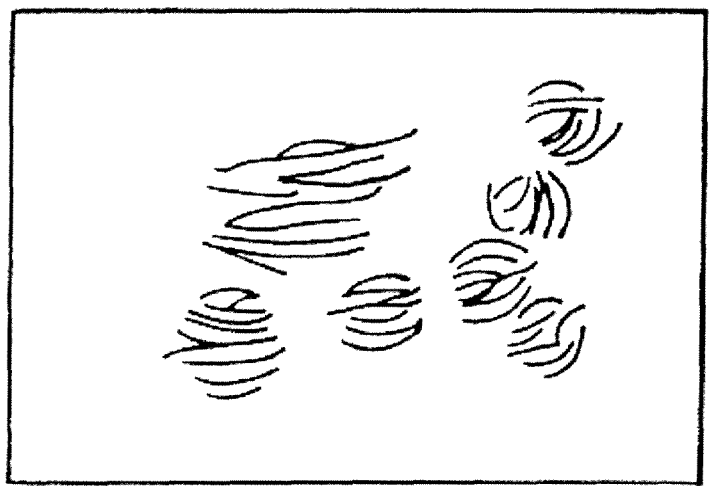
FIG. 3 shows a partial reconstruction, with a given level of confidence, of a print image.

For example, when the estimation of this additional information consists of a reconstruction of the fingerprint, the latter is only partial. The shapes of the ridge lines that can only be estimated with a level of confidence that is too low (since it is below the given level of confidence) are not reconstructed. An image of the type shown in FIG. 3 is thus obtained, where certain zones make apparent ridge lines reconstructed with the desired level of confidence, while the other zones remain empty. The size of the reconstructed zones around the minutiae depends on the chosen level of confidence.

To this end, during the reconstruction of the fingerprint, it is possible to estimate quality levels associated respectively with the additional information. This estimation can for example take account of the relative positions of the minutiae (a high concentration of minutiae generally allowing good quality additional information to be obtained), the positions of the minutiae within the fingerprint (the available minutiae characteristics can be less reliable at the edge of the fingerprint for example), etc.

An analysis of the estimated quality levels then makes it possible to retain only the additional information that has quality levels respecting the given level of confidence.

The level of confidence can be set according to different criteria, such as the envisaged application. It can for example be the result of a compromise between the desired quantity of additional information and the desired level of reliability for this additional information.

Several levels of confidence can furthermore be used in order to obtain respective sets of additional information.

By estimating only certain items of additional information on the fingerprint, for example by only partially reconstructing the shapes of the ridge lines of this image, a certain quality of the estimated information is ensured and the computing load, and therefore the time required for this phase, reduced.

The estimated additional information is then used in order to determine local descriptors around at least some of the minutiae of the set in question.

In the zones of the fingerprint where additional information has been estimated with the given level of confidence, the local descriptors are calculated on the basis of this information. Different types of calculation can be envisaged, in particular according to the nature of the previously-estimated additional information.

By way of example, when the additional information relates to orientations at different points of the fingerprint, the local descriptors can be obtained by calculating averages from the orientations in predefined local zones around the minutiae, optionally as well as deviations with respect to these averages.

According to a further example, when the additional information relates to orientations at different points of the fingerprint, the local descriptors can be obtained by determination of zones around at least some of the minutiae and application of respective filters in the determined zones.

This definition of zones and the consecutive application of local filters can be carried out for example according to the principles described in the article "Fingerprint matching from minutiae texture maps" mentioned in the introduction, or also in the article by A. K. Jain, S. Prabhakar, L. Hong, S. Pankanti, "FingerCode: a filterbank for fingerprint representation and matching", Proc. IEEE Computer Society, Conf. Computer Vision and Pattern Recognition (CVPR), vol. 2, pp. 187-193, 1999.

By way of illustration, a circle can thus be defined around at least some of the minutiae of the set in question. Then a division of this circle into concentric circles on the one hand and into sectors on the other hand makes it possible to obtain a plurality of zones around each of these minutiae. Gabor filters can then be applied in each of these zones in order to characterize the additional information within these zones. Thus a vector is obtained for each minutia, having a number of components equal to the determined number of zones and filters applied.

Of course, many variants of this illustrative example can be envisaged, as will be apparent to a person skilled in the art. In particular, the shape and/or the size of the determined zones, or also the nature of the applied filters, can vary according to need. For example it is not excluded for certain of the determined zones to overlap each other.

Advantageously, the determination of the local descriptors is such that these descriptors are rotation invariants of the fingerprint. To this end, it is possible for example to take account of the orientation of the minutiae in this determination. Thus, when the above-described method of determination is used, determination of the zones surrounding a minutia can be carried out by referring to the known direction of this minutia. In this way a marker is obtained for aligning the local descriptors around this minutia.

It is thus possible to obtain the same robustness with regard to the geometrical transformations that could impact on the fingerprint as in the prior art mentioned in the introduction.

Advantageously, when quality levels have been estimated as explained above, the determination of the local descriptors can take them into account. Thus, the local descriptors comprise, relative to zones containing additional information estimated with the given level of confidence, values calculated on the basis of said information while taking account of the estimated quality levels. A weighting of the values calculated on the basis of said information by a function of the estimated quality levels can for example be envisaged.

In this way, a subsequent biometric verification can be improved by considering two pseudo-identities to be identical when their most reliable components are identical or nearly identical.

In zones of the fingerprint not containing additional information estimated with the given level of confidence, the local descriptors are determined to comprise erasures.

It is recalled that "erasures" is a concept used in data coding/decoding. An erasure can be defined as one (or more) numerical value(s) different from the other values used in the coding and typically used for a data item when it is not known with accuracy what other value should be allocated thereto.

An erasure is treated in a specific fashion by an appropriate decoding algorithm. An example of such an algorithm will be given below. The use of erasures makes it possible to obtain better results than if the corresponding data items were regarded as errors.

The benefit of the use of erasures in determining the local descriptors will become more clearly apparent below.

At this stage, it will be noted that the number of erasures within the local descriptors will increase, the higher the level of confidence chosen for estimating the additional information.

Advantageously, the local descriptors can also comprise erasures in certain zones containing additional information estimated with the given level of confidence. This can be the case, for example, with respect to zones of the fingerprint where the quantity of additional information estimated with the given level of confidence is below a threshold. Only the zones of the fingerprint where the quantity of additional information estimated with the given level of confidence is above this threshold will then be allocated values calculated on the basis of said information.

Basing the local descriptors on a quantity of information that is insufficient and therefore potentially unreliable is thus avoided.

A quantization of the local descriptors according to a given number of integer values can then be performed. Thus a common format is obtained for the set of determined local descriptors. In this quantization, a value is reserved for the erasures. More than one value could also be reserved for this use.

The quantized local descriptors can thus take the form of q-area vectors, where at least one $(q+1)^{th}$ value is reserved for the erasures. By way of example, when q=2, these vectors are binary and their components can adopt the values 0 or 1, or also the additional value $\epsilon$ for the erasures.

An example of quantization capable of being implemented is the binarization method described in the thesis by A. W. K. Kong, "Palm print Identification Based on Generalization of Iris Code", PhD Thesis, University of Waterloo, Ontario, Canada, 2007, in particular in paragraph 5.3.2. Of course, other methods can also be envisaged, as will be apparent to a person skilled in the art.

The thus-quantized local descriptors are then coded using an error-tolerant coding algorithm and associated with a decoding algorithm devised in order to take account of the errors and erasures within the coded quantized local descriptors.

A coding according to the scheme described in the article by A. Juels, M. Wattenberg, "A fuzzy Commitment Scheme", ACME Conference on Computer and Communications Security, 1999, appears to be suitable for this purpose, although other codings can also be envisaged, as will be apparent to a person skilled in the art.

Using the principles of this article, an error correction coding can be applied to the quantized local descriptors.

It will be recalled that many error correction codes exist, the common feature of which is to generate a codeword from an initial data item, introducing redundancy thereto. For example, for an initial data item i, the codeword generated can be written c=f(i), where f is a public function relating to a given error correction code. A person with knowledge of the error correction code used can then retrieve the data item i on the basis of the codeword c and the inverse function of f, such that $i=f^{-1}(c)$.

Then a hash function (for example SHA-1, MD5, RIPE-MD, HAVAL, SNERFU, etc.) can be applied to the result of the previous operation, so as to obtain a hash algorithm that cannot be used as a basis for reliably retrieving the value of the quantized local descriptors.

A pseudo-identity can then be determined on the basis of at least some of the coded quantized local descriptors. It can consist of a single concatenation of the coded quantized local descriptors. As a variant, additional processing can be applied to the coded quantized local descriptors in order to define the pseudo-identity. Such a pseudo-identity can be used in order to characterize the individual to whom the fingerprint that corresponds to said characteristics of the set of minutiae in question belongs.

Determining a pseudo-identity such as that just described can be used in a phase of enrolment of an individual for example.

During an optional verification phase, a second pseudo-identity relating to an individual can be calculated and compared to the pseudo-identity resulting from the enrolment.

The comparison can be carried out in different ways, according to the format of the pseudo-identities. By way of example, a distance between the two pseudo-identities can be calculated then compared to a threshold above which it is considered that the pseudo-identities relate to the same individual.

After coding of the quantized local descriptors on the basis of which the pseudo-identities are determined, the verification phase uses the decoding algorithm associated with the above-mentioned coding algorithm. This decoding algorithm is devised in order to take account of errors and erasures within the coded quantized local descriptors.

The decoding algorithm described in the article by Fitzpatrick, "Errors-And-Erasures Decoding of BCH Codes" of January 1998 can be used, for example, although other algorithms can also be envisaged, as will be apparent to a person skilled in the art.

By taking advantage of erasures, the decoding algorithm allows a particularly efficient verification. The verification is in particular more efficient than if the items of information of low quality and/or insufficient quantity were processed in the same fashion as the reliable items of information, or as errors. It is considered that during decoding, an erasure is twice as easy to correct as an error.

Moreover, a pseudo-identity determined according to the above-described principles can be used in procedures implementing cryptographic algorithms, such as encryption algorithms and/or authentication or identification algorithms.

According to the invention, a computer program product can make it possible, when loaded and run on computer means, to implement all or some of the above-described steps, by means of suitable code instructions.

Also according to the invention, a device comprising suitable hardware and/or software units can also allow all or some of the above-described steps to be implemented.

An advantageous embodiment for determining a pseudo-identity will be more particularly described hereinafter, by way of illustration and non-limitatively.

In this embodiment, the following characteristics are initially available, for each minutia mi of a set of minutiae (m1 ..., mt) corresponding to a fingerprint with the following characteristics: its coordinates (xi,yi), its orientation θi and its type (bifurcation or ridge line ending). Moreover, the size of the fingerprint image to which the set of minutiae relates is available.

An estimation of additional information on said fingerprint on the basis of the characteristics of the set of minutiae is then carried out, adopting the principles described in the above-mentioned article "Fingerprint Image Reconstruction from Standard Templates".

These principles include in particular the following three steps:
1. An estimation of the outer limits of the print, following modelling of print shapes.
2. An estimation of the orientation field of the ridge lines, using several orientation models (different cases according to the shape classification: loops, arches, etc.). The orientation field is optimized iteratively, minimizing the difference between the known orientation of the minutiae and the estimated orientation. For a position (x,y) on the image, the estimated orientation is denoted $\Phi x,y$.
3. A reconstruction of the ridge lines.

In the present embodiment there is no need to repeat the fourth, finishing step described in the article "Fingerprint Image Reconstruction from Standard Templates" as it is not intended here to obtain a print image close to reality.

Moreover, in the present embodiment, the above-mentioned steps 2 and 3 are slightly modified with respect to the teaching of the article "Fingerprint Image Reconstruction from Standard Templates".

Firstly, at the end of step 2, a first quality measurement is carried out. For each minutia mi, a calculation is made of the difference $\Delta i$ between its actual angle θi and the estimated angle $\Phi xi,yi$. This parameter will be used to estimate the reliability of the zone surrounding a minutia.

As regards the above-mentioned step 3, it is modified as follows in the present embodiment.

As a starting point, a value hypothesis, chosen according to context, is adopted on the frequency ν of the ridge lines in the original print. This frequency can be regarded as the number of ridge lines in a given zone, which makes it possible to represent the mean separation between two ridge lines.

Two small prototype images, for example in black and white, are constructed as a function of ν in order to represent a bifurcation or a ridge line ending (these prototype images can be similar to those appearing in FIGS. 6 and 13 of the article "Fingerprint Image Reconstruction from Standard Templates").

The initialization of the image is carried out by positioning these prototype images at the sites of the minutiae mi, while respecting the type of each of the minutiae of the set, and following their orientation which was estimated during step 2.

Then, the reconstruction is carried out iteratively by applying real Gabor filters in order to progressively increase the size of the image around a minutia. A Gabor filter is defined by a function:

$$G_{\theta,\nu,\sigma}: (x, y) \mapsto e^{-\frac{(x+y)^2}{2\sigma^2}} \cos(2\pi\nu x') \quad (1)$$

wherein $x'= x \sin\theta + y \cos\theta$, σ corresponds to a standard deviation which is set as a function of the frequency ν, and θ corresponds to the orientation of the filter.

In order to apply such a filter at a point (x,y) of the image, the orientation θ is that estimated in step 2, i.e. $\Phi x,y$. Calculation of the new value is carried out by using a correlation product in an information window having a width and height T.

If $I_0$ denotes the image initialized with the prototypes positioned on the minutiae of the print, the calculated value $I_j(x,y)$ of the image at (x,y) in step $j \geq 1$ can be written:

$$I_j(x, y) = \sum_{-T/2 \leq \delta x, \delta y \leq T/2} I_{j-1}(x + \delta x, y + \delta y) \times G_{\Phi x,y,\nu,\sigma}(\delta x, \delta y) \quad (2)$$

Such an expression demonstrates the fact that after each iteration, the reconstructed zones increase in size (in each direction, approximately +2T in width and in height).

Contrary to the teaching of the article "Fingerprint Image Reconstruction from Standard Templates" according to which the reconstruction is iterated until the whole image is reconstructed (i.e. in order to fill the print zone estimated in step 1), only a partial reconstruction allowing a good estimation of the local orientations is carried out here. Moreover, the quality of the reconstruction is estimated at each step.

For this purpose, during the initialization of $I_0$, all that is situated outside the prototypes is considered as erased: an erasure, denoted c, is assigned to $I_0(x,y)$ if the position (x,y) is not in the image of one of the prototypes placed over the minutiae.

Consequently, the summation in expression (2) is modified so as to include only the values of $I_{j-1}$ that are not erasures.

Three additional parameters are also considered: a decision threshold τ for assigning a value, a threshold η for declaring an erasure and the description D of the form of the coding window detailed below (in practice, this can be a radius if the window is a disk).

In addition to the summation restriction in equation (2), a last step is carried out in order to evaluate $I_j(x,y)$. The summation result, here denoted $\Sigma x,y$, is compared with the threshold τ.

If the value $\Sigma x,y$ is greater than τ, then $I_j(x,y)=W$ (W for White is posited, for example 255 in RGW). If it is less than τ, $I_j(x,y)=B$ (B for Black) is posited. In case of equality with τ, it is considered that the position is erased, i.e. the value ε is assigned thereto. Moreover, in the first two cases (non-equality between $\Sigma x,y$ and τ), a decision cost $\Delta r(x,y)$ is calculated as the difference between $\Sigma x,y$ and τ. This value $\Delta r(x,y)$ represents the cost of changing to value B or N.

A quality score (or more precisely a non-quality score) q(x,y), that will be updated at each iteration according to different criteria, is associated with each position (x,y) in the image to be partially reconstructed. This score is calculated by means of a cost function k having real values.

While the position is considered to be erased (value ε), the score is zero. If at iteration j, the position changes status (i.e. adopts a value different from ε), j is called the appearance index of (x,y). This appearance index will be used to reflect the cost of changing from value c to a non-erased value: q(x,y) will correspond to the evaluation of a cost calculated via k in the inputs j and $\Delta r(x,y)$. During a future iteration, the quality is updated on the basis of the new estimation of $\Delta r(x,y)$ (but retaining the appearance index thereof).

It is noted that for a constant $\Delta r(x,y)$, the quality score increases strictly with j. This implies that the later the position appears, the lower the quality is considered. But this is no longer the case with variable Δr(x,y).

The iterations are carried out until:
either, around each minutia mi, all the positions below the window described by D centred on mi have already been reconstructed,
or all the positions remaining to be constructed below such a window have a quality score necessarily above the threshold.

After the iterations have stopped, the partial image is marked A and all the positions (x,y) of A wherein the (non-) quality is greater than η are declared as erased, i.e. that A(x,y) takes the value ε.

The determination of local descriptors around the minutiae, according to the present embodiment, can take place as follows.

On the basis of the reconstructed partial image, a series of local filters is applied around each minutia, using the orientation of said minutia in order to obtain an absolute reference, which leads to the construction of characteristic vectors.

The filters used are for example of the type described in one of the above-mentioned articles "Fingerprint matching from minutiae texture maps" and "FingerCode: a filterbank for fingerprint representation and matching", the coding window described by D then being a disk.

However, the construction of these characteristic vectors is carried out in this case by taking account of the qualities measured in the reconstruction step and of the erasures.

For example, following the principle described in the article "Fingerprint matching from minutiae texture maps", a disk is outlined, centred around a minutia mi in several zones and, in each zone, Gabor filters are applied, for example following 8 predefined orientations α1 ..., α8, considering the orientation of mi as the origin, and using a formula of the type of expression (2) in order to apply the filters.

A value for each of the 8 orientations α is then associated with each zone, by calculating an AAD (Average Absolute Deviation from the mean) on the basis of all the values calculated in this zone for a single orientation α.

However the summation is restricted to the non-erased positions and the quality scores are also used for weighting the different values. The calculation for the minutia mi involves the values $$B(x, y) = \sum_{-T/2 \leq \delta x, \delta y \leq T/2, if\ A(x+\delta x, y+\delta y) \neq \varepsilon} \frac{A(x+\delta x, y+\delta y)}{h(q(x+\delta x, y+\delta y), \Delta i)} \times G_{\theta i+\alpha,v,\sigma}(\delta x, \delta y) \quad (3)$$

where A is the partial image reconstructed in the previous step and h has an increasing function.

Also, a new parameter K is introduced which makes it possible to erase a zone if the number of positions erased in this zone is greater than or equal to K.

The thus-determined local descriptors are then quantized, for example as binary vectors. The techniques described in the above-mentioned thesis "Palmprint Identification Based on Generalization of IrisCode" can be used to this end.

The erasures are however taken directly from the non-quantized local descriptors.

The coding of the quantized vectors can use the scheme described in the above-mentioned article "A fuzzy Commitment Scheme" so as to be able to correct the differences between two takes.

However an error correction code is chosen associated with a decoding algorithm making it possible to take account simultaneously of the erasures and the errors, such as that described in the above-mentioned article "Errors-And-Erasures Decoding of BCH Codes".

A pseudo-identity can finally be constructed on the basis of the coded vectors.

It should be recalled that the embodiment that has just been described does not in any way limit the general principles of the invention introduced above. For example, it is in fact possible that some of the operations forming part of this example are not implemented, or are replaced by other operations.

The invention claimed is:

1. A method of determining a pseudo-identity from characteristics of a set of minutiae corresponding to a fingerprint, comprising the steps of:
    estimating additional information on said fingerprint from characteristics of said set of minutiae and with a given level of confidence;
    determining local descriptors around at least some of the minutiae of said set of minutiae, the local descriptors comprising:
        (i) relative to zones containing the additional information estimated with the given level of confidence, values calculated from said information, and
        (ii) relative to zones not containing the additional information estimated with the given level of confidence, erasures;
    quantizing the determined local descriptors in the form of q-area vectors, wherein at least one $(q+1)^{th}$ value is reserved for the local descriptors comprising the erasures;
    coding the quantized local descriptors using an error-tolerant coding algorithm associated with a decoding algorithm devised in order to take account of the errors and erasures within the coded quantized local descriptors; and
    determining a pseudo-identity based on at least some of the coded quantized local descriptors.

2. The method as claimed in claim 1, wherein the estimated additional information relates to orientations at different points of the fingerprint.

3. The method as claimed in claim 1, wherein the estimated additional information relates to a shape of the fingerprint ridge lines.

4. The method as claimed in claim 1, wherein the determination of the local descriptors around at least some of the minutiae of said set of minutiae is such that the local descriptors contain:
    (i) relative to the zones containing a quantity of the additional information estimated with the given level of confidence, above a threshold, values calculated from said information, and
    (ii) relative to the zones not containing a quantity of the additional information estimated with the given level of confidence, below said threshold, erasures.

5. The method as claimed in claim 1, wherein quality levels associated respectively with the additional information are further estimated, and wherein the local descriptors comprise, relative to the zones containing the additional information estimated with the given level of confidence, the values calculated from said information, taking account of the estimated quality levels.

6. The method as claimed in claim 1, wherein the determination of the local descriptors is such that the local descriptors are rotation invariants of the fingerprint.

7. The method as claimed in claim 1, wherein the determination of the local descriptors comprises determining zones around at least some of the minutiae of said set of minutiae and the application of respective filters in the determined zones.

8. A device for determining a pseudo-identity from characteristics of a set of minutiae corresponding to a fingerprint, the device comprising:
- a unit for estimating additional information on said fingerprint from the characteristics of said set of minutiae and with a given level of confidence;
- a unit for determining local descriptors around at least some of the minutiae of said set of minutiae, the local descriptors comprising:
  - (i) relative to zones containing the additional information estimated with the given level of confidence, values calculated from said information, and
  - (ii) relative to zones not containing the additional information estimated with the given level of confidence, erasures;
- a unit for quantizing the determined local descriptors in the form of q-area vectors, wherein at least one $(q+1)^{th}$ value is reserved for the local descriptors comprising the erasures;
- a unit for coding the quantized local descriptors using an error-tolerant coding algorithm associated with a decoding algorithm devised in order to take account of the errors and erasures within the coded quantized local descriptors; and
- a unit for determining a pseudo-identity based on at least some of the coded quantized local descriptors.

9. A non-transitory computer-readable medium storing a program thereon for determining a pseudo-identity from characteristics of a set of minutiae corresponding to a fingerprint, the computer program comprising code instructions for implementing the following steps when loaded and run on computer equipment:
- estimating additional information on said fingerprint from characteristics of said set of minutiae and with a given level of confidence;
- determining local descriptors around at least some of the minutiae of said set of minutiae, the local descriptors comprising:
  - (i) relative to zones containing the additional information estimated with the given level of confidence, values calculated from said information, and
  - (ii) relative to zones not containing the additional information estimated with the given level of confidence, erasures;
- quantizing the determined local descriptors in the form of q-area vectors, wherein at least one $(q+1)^{th}$ value is reserved for the local descriptors comprising the erasures;
- coding the quantized local descriptors using an error-tolerant coding algorithm associated with a decoding algorithm devised in order to take account of the errors and erasures within the coded quantized local descriptors; and
- determining a pseudo-identity based on at least some of the coded quantized local descriptors.

10. A cryptographic method implementing a cryptographic algorithm, wherein the cryptographic algorithm uses a pseudo-identity determined from characteristics of a set of minutiae corresponding to a fingerprint, wherein the determination of the pseudo-identity comprises:
- estimating additional information on said fingerprint from characteristics of said set of minutiae and with a given level of confidence;
- determining local descriptors around at least some of the minutiae of said set of minutiae, the local descriptors comprising:
  - (i) relative to zones containing the additional information estimated with the given level of confidence, values calculated from said information, and
  - (ii) relative to zones not containing the additional information estimated with the given level of confidence, erasures;
- quantizing the determined local descriptors in the form of q-area vectors, wherein at least one $(q+1)^{th}$ value is reserved for the local descriptors comprising the erasures;
- coding the quantized local descriptors using an error-tolerant coding algorithm associated with a decoding algorithm devised in order to take account of the errors and erasures within the coded quantized local descriptors; and
- determining a pseudo-identity based on at least some of the coded quantized local descriptors.

* * * * *